(12) United States Patent
Weyand

(10) Patent No.: US 6,224,139 B1
(45) Date of Patent: May 1, 2001

(54) TARPALIN COVER

(76) Inventor: David K. Weyand, 3055 Kingwood Rd., Rockwood, PA (US) 15557

( * ) Notice: Subject to any disclaimer, the term of this patent is extended or adjusted under 35 U.S.C. 154(b) by 0 days.

(21) Appl. No.: 09/326,992

(22) Filed: Jun. 7, 1999

(51) Int. Cl.[7] .................................................. B60P 7/02
(52) U.S. Cl. ................................ 296/100.16; 296/100.15; 296/100.17; 296/100.18; 52/3
(58) Field of Search ...................... 296/100.15, 100.16, 296/100.17, 100.18; 52/3

(56) References Cited

U.S. PATENT DOCUMENTS

| | | |
|---|---|---|
| 181,047 | 8/1876 | Cremer . |
| 2,465,621 | * 3/1949 | Wheeler .......................... 296/100.15 |
| 3,066,974 | * 12/1962 | Ambil ............................. 296/100.17 |
| 3,481,371 | 12/1969 | Row ..................................... 139/419 |
| 3,494,658 | * 2/1970 | Maes ............................... 296/100.15 |
| 3,882,575 | 5/1975 | Jolly ........................................ 24/203 |
| 3,955,732 | * 5/1976 | Boschen ......................... 296/100.15 |
| 4,523,784 | * 6/1985 | Aspen ............................. 296/100.15 |
| 4,607,876 | * 8/1986 | Reed ............................... 296/100.16 |
| 4,739,528 | * 4/1988 | Allen ............................... 296/100.16 |
| 4,813,734 | * 3/1989 | Hoover ............................ 296/100.17 |
| 4,923,240 | * 5/1990 | Swanson ........................ 296/100.18 |
| 4,979,776 | * 12/1990 | Schweickert ................... 296/100.15 |
| 5,050,924 | * 9/1991 | Hansen ........................... 296/100.15 |
| 5,137,324 | * 8/1992 | Hershberger .................. 296/100.16 |
| 5,203,055 | 4/1993 | Broadwater, Sr. .................... 24/462 |
| 5,299,849 | * 4/1994 | Cook et al. ..................... 296/100.15 |
| 5,324,091 | * 6/1994 | Baker .............................. 296/100.18 |
| 5,431,474 | * 7/1995 | Burkey ............................ 296/100.15 |
| 5,620,040 | * 4/1997 | Swanner ......................... 296/100.16 |
| 5,741,041 | * 4/1998 | Sullivan .......................... 296/100.16 |
| 5,839,237 | * 11/1998 | Davidson ................................ 52/3 |

FOREIGN PATENT DOCUMENTS 2517269    11/1981   (FR) .

* cited by examiner

*Primary Examiner*—Joseph D. Pape
*Assistant Examiner*—Kiran Patel
(74) *Attorney, Agent, or Firm*—Carothers & Carothers

(57) ABSTRACT

A tarpaulin cover having a fabric cover sheet which has an elastic band extending around portions of its perimeter and contained in a hem. A number of spaced cutouts are provided along the hem for exposing the elastic band for tie down hooking and unhooking access. Opposite ends of the elastic cord are secured within the hem around respective rivets that in turn are secured to and passed through the hem with respective terminating ends of the elastic cord secured to itself whereby opposite terminating loop ends of the elastic cord are secured respectively within the hem around these rivets.

6 Claims, 2 Drawing Sheets

TARPALIN COVER

BACKGROUND OF THE INVENTION

This invention relates to an improved means for holding down the free edges of a tarpaulin or the like which may be employed on trucks, campers and other equipment.

Present day fire trucks commonly use tarpaulins or tonneau covers over the top of upwardly open compartments containing fire hoses, tools, etc. Temperature changes make the tarpaulin fit differently and the tarpaulin will become loose in hot weather and tight in cold weather.

With present day tarpaulins used on such fire trucks, the fireman tend to skip tarpaulin fasteners in cold weather, and in addition, when the firemen walk on the tarpaulin over compartments to find tools or supplies or to access stored hose, the tarpaulin tears and is subjected to undue strain on the fasteners which commonly break.

In addition, overloading in the hose bed is also a problem and the firemen tend to hold as much equipment and hose on the trucks as possible usually resulting in overload and stress on the tarpaulin covers of the prior art readily tear when subjected to such abuse.

Another problem encountered on such fire trucks is that there are many side compartments for storing tools and equipment and there is no present day system for insuring that the tools and equipment within the compartment will stay in place, no matter whether the side compartment is provided with or without a door.

It is a principle object of the present invention to provide a tarpaulin cover and a system for vertically covering a shelf pocket provided on the side of a fire truck or other motor vehicle which eliminates the aforementioned problems incurred with the prior art structures.

SUMMARY OF THE INVENTION

The tarpaulin cover of the present invention includes a fabric cover sheet having an elastic band extending around desired or selected portions of its perimeter and contained in a hem. A plurality of spaced cutouts are provided along the hem for exposing the elastic band at positions desired for tie down hooking and unhooking access. Opposite ends of the elastic cord are secured within this hem around respective rivets that are secured to and pass through the hem. Terminating ends of the elastic cord are secured to itself whereby opposite terminating loop ends of the elastic cord are provided and secured respectively within the hem around the respective rivets.

The tarpaulin cover of the present invention may also be utilized in a system for covering a shelf pocket provided on the side of a motor vehicle. In this embodiment the tarpaulin cover as described is basically the same, but is generally rectangular and at least two of the cutouts are provided in opposite corners along a top side of the cover sheet for securing these top outer corners to the side wall of the vehicle. The bottom side is secured to a bottom edge of the shelf pocket opening which the tarpaulin cover is intended to cover.

In this manner, a shelf pocket provided on the side of a motor vehicle may be easily covered by the tarpaulin of the present invention to retain tools and other implements in place on the shelf.

The terminal loop ends of the elastic cord are secured within the hem by stainless steel crimp hooks wherein the hook is crimped securely to the terminal end of the cord and the other end hooks snugly about itself in order to form the terminal end loops.

BRIEF DESCRIPTION OF THE DRAWINGS

Other objects and advantages are disclosed hereinafter in the detailed description and claims. The accompanying drawings show, for the purpose of exemplification, without limiting the invention or the appended claims, certain practical embodiments of the present invention wherein:

DETAILED DESCRIPTION OF THE PREFERRED EMBODIMENTS

Figure 1:
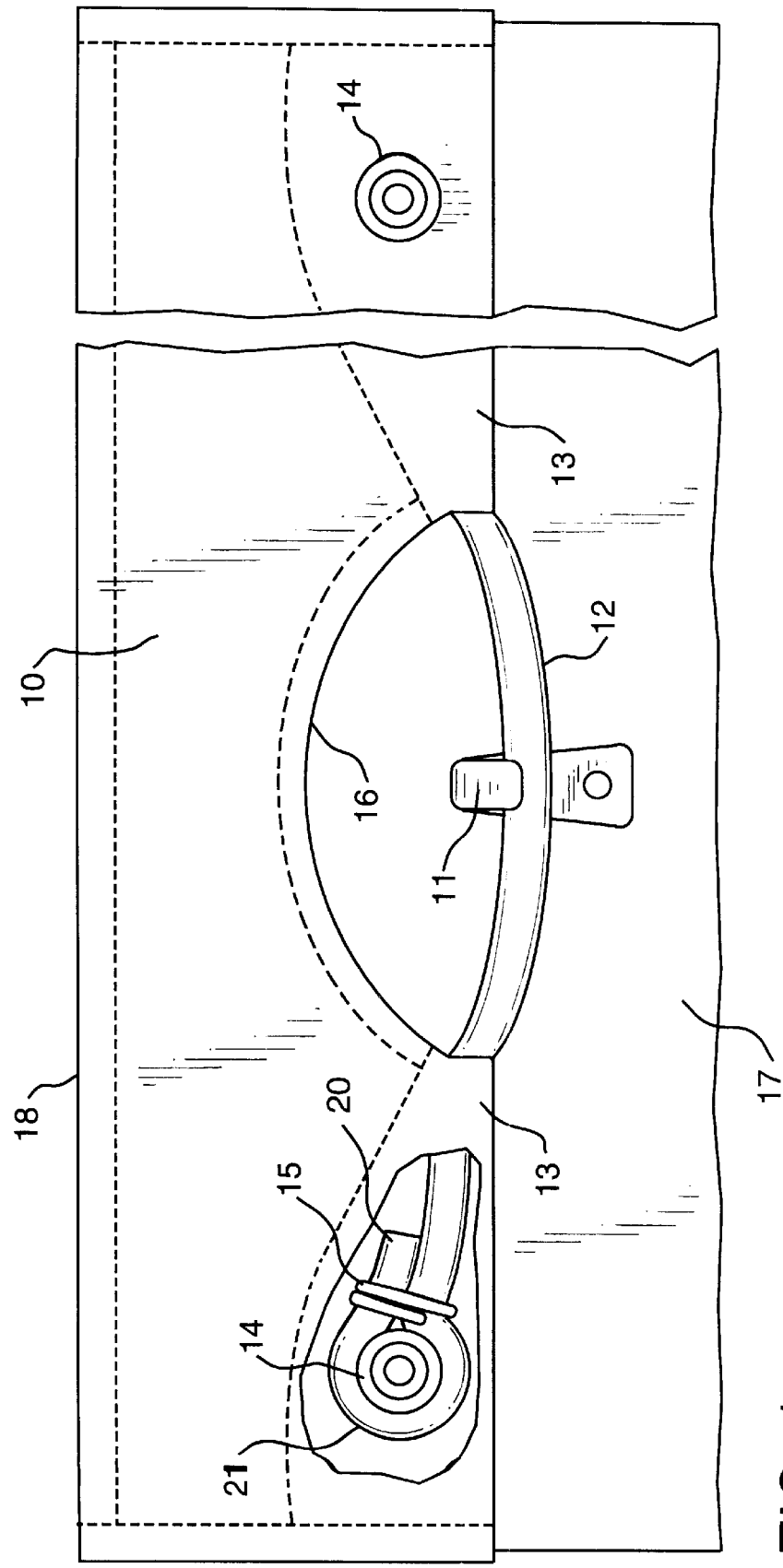
FIG. 1 is a view in side elevation, with mid portions broken away, showing the tarpaulin cover of the present invention as being received over the top of an upwardly open fire truck bed.

Turning to FIG. 1, the tarpaulin cover 10 of the present invention is comprised of a fabric cover sheet having an elastic band 12 extending around selected portions of its perimeter and contained in hem 13 with a plurality of spaced cutouts 16 along the hem for exposing the elastic band 12 for tie down hooking and unhooking access on hooks 11 which are secured to the side panel 17 of the fire truck. The tarpaulin 10 extends entirely over the top 18 of the upwardly open fire truck bed to cover the same in order to secure objects contained in a compartment (not shown) thereunder.

Opposite terminating ends 20 of elastic cord 12 are secured within hem 13 around respective rivets 14 which are secured to and pass through hems 13. Respective terminating ends 20 of elastic cord 12 are secured to itself with steel crimp hooks 15. This configuration provides terminal loop ends 21 for the elastic cord which are respectively secured within the hem 13 around the rivets 14 as illustrated.

Another embodiment of the tarpaulin cover 10 of the present invention is illustrated in a system for vertically covering a shelf pocket 22 provided on or in the side 17 of the fire truck.

Here tarpaulin cover sheet 10 has a top edge 23 and a bottom edge 24 and two side edges 25.

In this embodiment cover sheet 10 is provided with cutouts 16 along the hem 13 at the upper outside corners of the tarpaulin cover sheet 10 formed between top edge 23 and the two side edges 25 for exposing elastic band 12 at the corners for hooking and unhooking access onto hooks 11 secured to the side 17 of the truck panel.

Opposite terminating ends 20 of elastic cord 12 secured within hem 13 at the two side edges 25 around respective rivets 14 with stainless steel crimp hooks 15 in the same fashion as illustrated in FIG. 1.

The bottom edge 24 of tarpaulin cover sheet 10 is secured to a bottom edge of the opening 26 of the shelf pocket 22 with spaced eyelets 27 which pass through and are secured to the bottom edge 24 tarpaulin 10. Respective toggle fasteners 28 are secured to the side 17 of the fire truck panel in aligned relationship with eyelets 27 so that they respectively pass through the eyelets 27 and are pushed to the downward position as illustrated in FIG. 2 to securely retain the bottom edge 24 in position.

Figure 2:
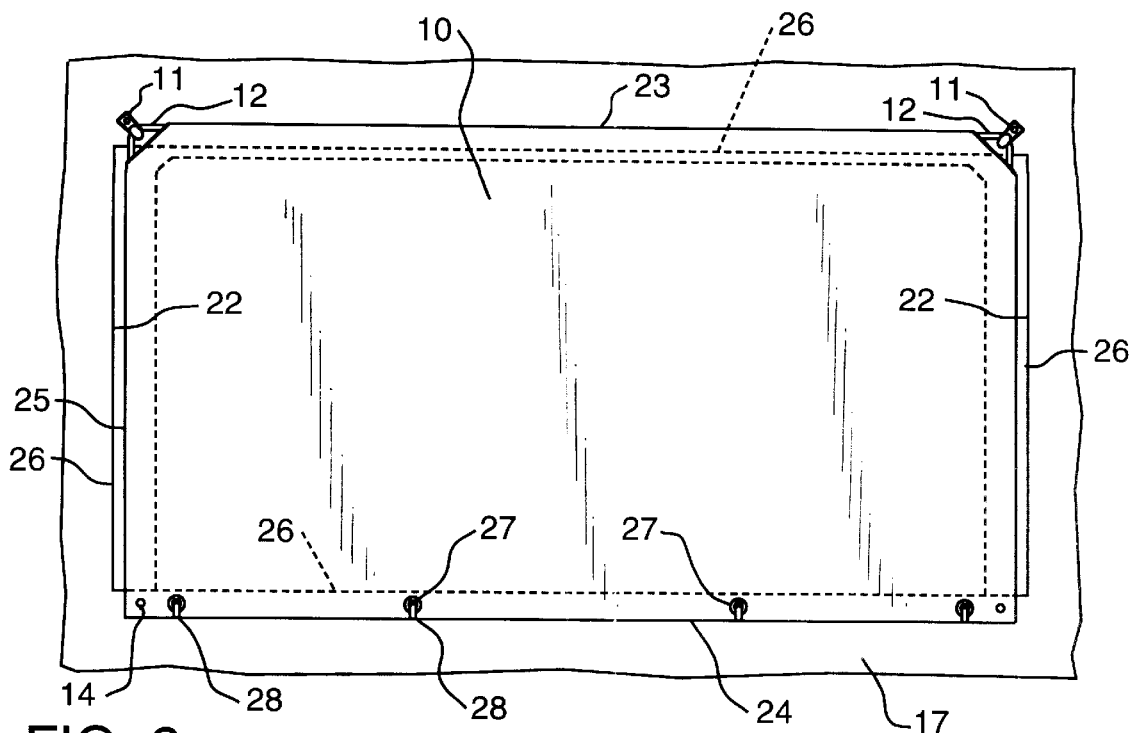
FIG. 2 is a view in side elevation illustrating the tarpaulin cover of the present invention vertically covering a shelf pocket provided in the side of a fire truck or other motor vehicle.
Figure 3:
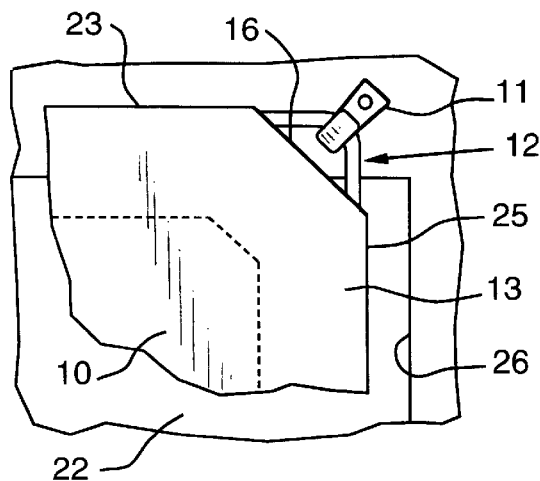
FIG. 3 is an enlarged view of the upper right hand corner portion of the tarpaulin cover shown in FIG. 2 with the remainder portion of the tarpaulin broken away for clarity and detail illustration.
Figure 4:
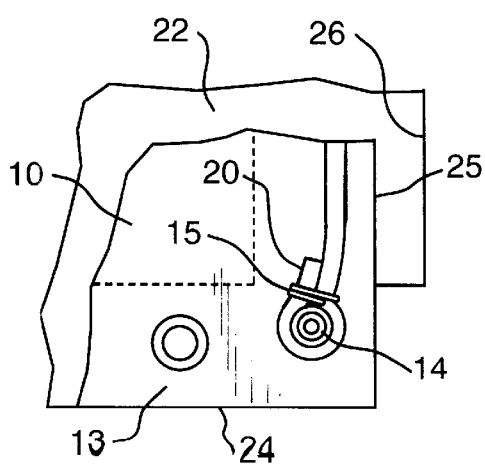
FIG. 4 is an enlarged view of the lower right hand corner portion of the tarpaulin cover shown in FIG. 2 with a portion of the outer tarpaulin material removed to expose the interior of the hem.

Of course any other desired conventional mechanism or method may be utilized to secure the bottom edge 24 of the tarpaulin 10 in FIG.2 to the bottom of the shelf pocket 22.

In the manner shown, objects contained within the shelf pocket 22 are therefore easily held in position while the fire truck is underway.

With some fire trucks, this tarpaulin cover sheet 10, together with the shelf pocket 22 might additionally be covered with an outer door that lifts upwardly out of the way. In this latter situation the tarpaulin 10 of FIG. 2 still retains the contents of the shelf pocket 22 in position even when the door has been open so that any objects which might have shifted within the shelf pocket will not automatically fall out when the side door (not shown) is opened.

Then, the firemen may carefully disconnect the upper corners of the elastic cord 12 from the respective hooks 11 to easily catch any falling objects.

I claim:

1. A tarpaulin cover comprised of a fabric cover sheet having an elastic band extending around selected portions of its perimeter and contained in a hem with a plurality of spaced cut-outs along the hem for exposing the elastic band for tie down hooking and unhooking access, opposite ends of said elastic cord secured within said hem around respective rivets whereby said rivets are secured to and pass through said hem with respective terminating ends of said elastic cord looped around the rivets and secured to itself.

2. The tarpaulin cover of claim 1 wherein said cover sheet is rectangular and at least two of said cutouts are provided in opposite corners of a first long side of the cover sheet and a long side of the cover sheet opposite the first side includes a fastener for securing the cover sheet along this opposite side to a structure.

3. The tarpaulin cover of claim 2 wherein said fastener includes eyelets secured along said opposite long side in spaced relationship.

4. The tarpaulin cover of claim 1 wherein said terminal loop ends of said elastic cord are secured with steel crimp hooks.

5. A system for vertically covering a shelf pocket provided on the side of a motor vehicle, comprising:

a tarpaulin cover sheet having top and bottom edges and two side edges and a shape corresponding to that of an opening for the shelf pocket and a hem extending around the perimeter of said top edge and said two side edges;

an elastic band extending around the perimeter and contained within said hem;

cut-outs along said hem at corners of said tarpaulin cover sheet formed between said top edge and said two side edges for exposing said elastic band at said corners for hooking and unhooking access.

opposite ends of said elastic cord secured within said hem at said two side edges around respective rivets which are secured to and pass through said hem with respective terminating ends of said elastic cord looped around the rivets and secured to itself;

the bottom edge of said tarpaulin cover sheet secured to a bottom edge of the opening for the shelf pocket; and corner hooks at upper opposite corners of the opening for the shelf pocket for receiving and retaining said elastic cord exposed at said top tarpaulin cover sheet corners for thereby vertically covering the shelf pocket.

6. The system of claim 5 wherein said terminal loop ends of said elastic cord are secured with steel crimp hooks.

* * * * *